W. C. Clover,

Curtain Fixture.

No. 108,761.  Patented Nov. 1, 1870.

Witnesses.
Frank Clover.
Henry E. Clover.

Inventor.
William C. Clover.

United States Patent Office.

WILLIAM C. CLOVER, OF BROOKLYN, NEW YORK, ASSIGNOR TO HENRY E. CLOVER, OF SAME PLACE.

Letters Patent No. 108,761, dated November 1, 1870.

IMPROVEMENT IN CURTAIN-FIXTURES.

The Schedule referred to in these Letters Patent and making part of the same.

I, WILLIAM C. CLOVER, of Brooklyn, in the county of Kings and State of New York, have invented an Improved Window-Shade Pulley, of which the following is a specification.

Nature and Object of the Invention.

My invention relates to the combination of a sliding bridge, spiral spring, and nut, confined to a vertical set-screw, the whole secured upon a plate in such a manner that, by turning the screw by a thumb-piece, the bridge is caused to traverse the screw.

The object of the invention is so to secure the cord that it may be lengthened or shortened uniformly, and firmly secured from shifting or displacement, at the same time the effect of the spiral spring is to compensate for the atmospheric contraction or expansion of the cord.

Description of the Accompanying Drawing.

Figure 1:
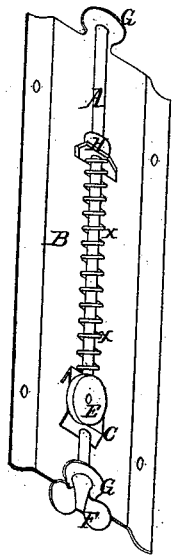

Figure 1, front elevation of the machine embodying my invention.

Figure 2:
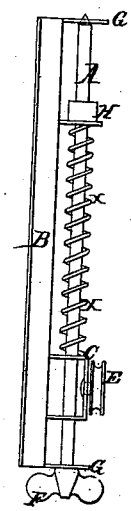

Figure 2, side view of the same.

Figure 3:
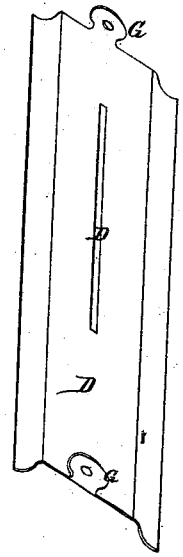
Figure 3:
Figure 3:
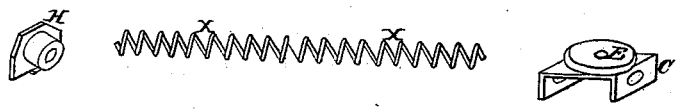

Figure 3, raised metal plate, to which the combination above referred to is secured by projecting flanges at each end.

General Description.

A, screw secured to the plate at each end by flanges, and passing through the bridge, the spiral-wire spring, and the nut.

B, raised metal plate, with molded edges and projecting flanges, comprising the body of the machine.

C, sliding bridge secured to the screw, and having a grooved wheel upon its face.

D, slot in the plate, to guide the nut.

E, revolving grooved wheel, secured at its axis upon the face of the bridge.

F, thumb-piece of screw.

G, projecting flanges at the ends of the plate, which secures the screw to the plate.

H, nut at upper end of screw, which, by action of the screw, is drawn down upon the spring, which, in its turn, is forced upon the bridge to which the wheel holding the cord is attached. By turning the screw the cord is contracted or lengthened, as required.

X X, spiral-wire spring; the upper end confined by the nut, the lower end bearing upon the bridge, giving it an easy pressure.

I do not claim the movable screw and nut, nor wire spring, as applied to window-shade pulleys.

Claim.

I claim for my invention—

The set-screw and sliding bridge-wheel, in combination with the nut and wire spring, as and for the purpose hereinbefore set forth.

WILLIAM C. CLOVER.

Witnesses:
 FRANK CLOVER,
 HENRY E. CLOVER.